United States Patent

[11] 3,632,995

[72] Inventor Howard W. Wilson
918 Glenhaven Drive, Pacific Palisades, Calif. 90272

[21] Appl. No. 729,876
[22] Filed May 9, 1968
[45] Patented Jan. 4, 1972

[54] CODED ARTICLE
29 Claims, 31 Drawing Figs.

[52] U.S. Cl. .......... 235/61.12 N
[51] Int. Cl. .......... G06k 19/06
[50] Field of Search .......... 235/61.11, 61.115, 61.12; 250/219; 178/69.5

[56] References Cited

UNITED STATES PATENTS

| | | | |
|---|---|---|---|
| 3,211,470 | 10/1965 | Wilson | 235/61.12 UX |
| 3,316,392 | 4/1967 | Bailey et al. | 235/61.12 |
| 2,357,444 | 9/1944 | Armbruster | 235/61.12 UX |
| 3,220,301 | 11/1965 | Koonz et al. | 235/61.12 X |
| 2,353,002 | 7/1944 | Armbruster | 235/61.8 |
| 3,283,303 | 11/1966 | Cerf | 235/61.12 |
| 2,952,008 | 9/1960 | Mitchell et al. | 235/61.12 UX |
| 3,342,978 | 9/1967 | Cameron et al. | 235/61.11 (5) |
| 3,414,731 | 12/1968 | Sperry | 250/219 |
| 3,418,456 | 12/1968 | Hamisch et al. | 250/219 |
| 3,458,706 | 7/1969 | Ravenhall et al. | 250/219 |
| 3,482,082 | 3/1966 | Isreeli | 235/61.12 |
| 2,288,770 | 7/1942 | Armbruster | 235/61.12 |

*Primary Examiner*—Daryl W. Cook
*Attorney*—Olson, Trexler, Wolters & Bushnell

ABSTRACT: A merchandising coupon having a coded information track comprising a pair of substantially parallel rows of adjacent portions of contrasting character (for example, black and white), the portions of the first of said rows serving as a timer track, and the portions of the second of said rows serving as an information track; the contrasting portions of the first row being symmetrically and uniformly spaced to serve as a timing or clocking track, and the contrasting portions of the second row being of a length to overlie one or more of the adjacent contrasting portions of the first row, whereby said rows, when correlated in a binary system, operate according to a nonreturn-to-zero method in order to provide substantial manufacturing, shipping, receiving, ordering or marketing inventory control and accounting information, and capable of being imprinted at any handling stage with one or more additional rows of data operating in substantially the same manner.

Inventor
Howard W. Wilson
By: Olson, Trexler, Wolters & Bushnell Attys

Inventor
Howard W. Wilson
By: Olson, Trexler, Wolters & Bushnell attys.

Inventor
Howard W. Wilson
By: Olson, Trexler, Wolters & Bushnell attys.

Inventor
Howard W. Wilson
By: Olson, Trexler, Wolters & Bushnell Attys.

Inventor
Howard W. Wilson
By: Olson, Trexler, Wolters & Bushnell
Attys

Inventor
Howard W. Wilson
By: Olson, Trexler, Wolters & Bushnell
Attys.

CODED ARTICLE

The present invention relates to a general purpose document or coupon used in the handling of merchandise and services. The document or coupon is optically scannable, and can also be read by humans, and can serve as an input to computers. The coupon is adapted for use in connection with the sale of goods, wares or merchandise, or services, and may be traded by customers for credit such as trading stamps, money, etc., and may be used as a basis of inventory and warehouse control in reordering, may be used for credit, billing, audit trail, and credit cards, and may be used as an automatic checkout counter or for machine recording, imprinting, and tabulation. The coupon may serve in lieu of trading stamps or money, and has a novel binary machine language coded information track along with alphanumeric characters or symbols for human-readable data and optical character recognition information, and may serve directly or through an intermediate step such as microfilming as input to a computer, or may be utilized by a human being upon reading of the human-readable indicia to prepare material for input to a computer.

BACKGROUND OF THE INVENTION

Merchandising coupons have heretofore been attached to or otherwise delivered with the sale of goods or merchandise of various sorts. Typically, a coupon has related to a particular manufacturer, and has had to be returned to that manufacturer for redemption. Punchcards and punched tags have been used, and efforts have been made to use magnetic ink under the system known as MICR (Magnetic Ink Character Recognition) such as is used in bank checks. One superior prior art merchandising coupon of more or less universal use for dissemination by a great number of manufacturers, and redeemed through a central clearing house where the coupon is optically scanned with the information optically read therefrom being used for the input of a computer, is shown in my prior U.S. Pat. No. 3,211,470, for "CODED COUPON." Although the coupon in the aforementioned patent represents a vast step forward over previous prior art, the code therein was a "return-to-zero" system, and some limitation as to the total amount of information that could be encoded in a given physical space, along with certain complications resulting from inherent deficiencies in the current state of the graphic arts, was therefore inherent. However, parity check data was carried by the encoded information tracks of that coupon in order to regenerate information in the event of mutilation of a coupon, resulting in tearing away of a part of the track.

Information read from the foregoing coupon was fed onto magnetic tape or directly into a computer, and as will be appreciated, a computer operates at high speed and can receive input at very high speed. Modern computers are quite expensive apparatus and, economically, must be kept operating as much of the time as possible. Conversely stated, idle time is quite expensive. Obviously, therefore, manual handling and sorting of all of the individual coupons is quite out of the question for feeding to a computer reader, and is in any event too expensive in its own right. Due to various packaging requirements, some of which will be self-evident and others of which will be set forth hereinafter, merchandising coupons are preferably made of paper or other thin material, whereby it is often difficult to handle such coupons rapidly in automatic machinery.

Coupons such as disclosed in my prior U.S. Pat. No. 3,211,479, for reasons of economy and convenience, are printed on high-speed printing machinery. The characteristics of printing ink and of paper, as well as the nature of printing plates, cylinders and press equipment and devices as generally used in the graphic art fields, has been such as to cause contraction of the printed code in some cases, and stretch and spread in other cases, along with various other kinds of distortion, all of which has changed the dimensional characteristics of code bars on the information tracks to the extent that reading—particularly direct scanning—of such coupons has not in every instance been as reliable as might be desired.

SUMMARY OF THE INVENTION

The present invention is concerned with a merchandising coupon having a nonreturn-to-zero code thereon, specifically a binary code, including two tracks. The first track comprises a series of alternating contrasting sections or portions (such as black and white) serving as a timing or clocking track, while the second row is disposed adjacent the first row and serves as an information track. Since there need not be a return to zero from one bit of information to another, a much greater amount of information may be stored in a given space. The contrasting portions of the first row are symmetrically disposed, while the contrasting portions of the second row may be of the same length as a portion of the first row, or may be of a length equal to two or more portions of the first row.

One way to have the most efficient use of computer time, and to afford more accurate reading, is to photographically reduce the two tracks on microfilm, with a reduction on the order of 20 to one, thereby leading to great economy and speed of operation. A great many sets of tracks can be recorded on a single microfilm, whereby the information from a great many coupons may be fed into a programmable microfilm scanner or reader and into a computer at extremely high speed.

Also, in accordance with the present invention, additional rows or tracks of information may be applied to the coupon from time to time during its progress from the time of materials ordering through manufacturing and distribution on or in the product with which it is disseminated to its final destination both to provide an audit trail, and to insure against mishandling of the coupon.

In accordance with a specific preferred example of the invention, the contrasting portions of both the timer or clocker row and the information row comprise alternating rectangular sections. However, other shapes are satisfactory, as will be set forth hereinafter.

In view of the foregoing, it is an object of the present invention to provide a novel merchandising coupon having optical machine language and machine-readable code thereon in a nonreturn-to-zero system, thereby enabling a maximum of information to be coded in a minimum space.

Furthermore, it is an object of the present invention to provide a coupon having a code thereon which is machine readable in machine language, along with characters which are both human and machine readable as characters.

More specifically, it is an object of the present invention to provide a merchandising coupon having a novel coded information track thereon employing two or more side-by-side parallel rows of contrasting portions, the first row serving as a timing or clocking row, and the second serving as an information-bearing row.

Yet another object of the present invention is to provide a merchandising coupon having a machine-readable code thereon and adapted for the addition of subsequent machine code during the handling or processing of the coupon.

It is still another object of the present invention to provide a merchandising coupon having a coded track thereon having a high tolerance to printing and other graphic arts distortions thereon.

Yet another object of the present invention is to provide a merchandising coupon having a machine-readable code thereon in combination with microfilming to permit a maximum of information to be read into a computer at the highest efficiency.

Yet another object of the present invention is to provide a merchandising coupon having machine-readable code thereon wherein the coupon is made as a part of a product wrapper having a novel perforation and tearoff arrangement for permitting accurate and safe separation of the coupon from the wrapper without significant danger of mutilating the coupon.

Another object of the present invention is to provide a novel merchandising coupon having a machine-readable code thereon permitting maximum tolerance to printing and other graphic arts inaccuracies, as well as accommodating for skew and other variations caused by improper shearing or other removal of the coupon from a common sheet, or due to improper alignment during a microfilming process or other kind of automated reading.

Other and further objects and advantages of the present invention will be apparent from the following description when taken in connection with the accompanying drawings wherein.

Figures 29, 30, 31:
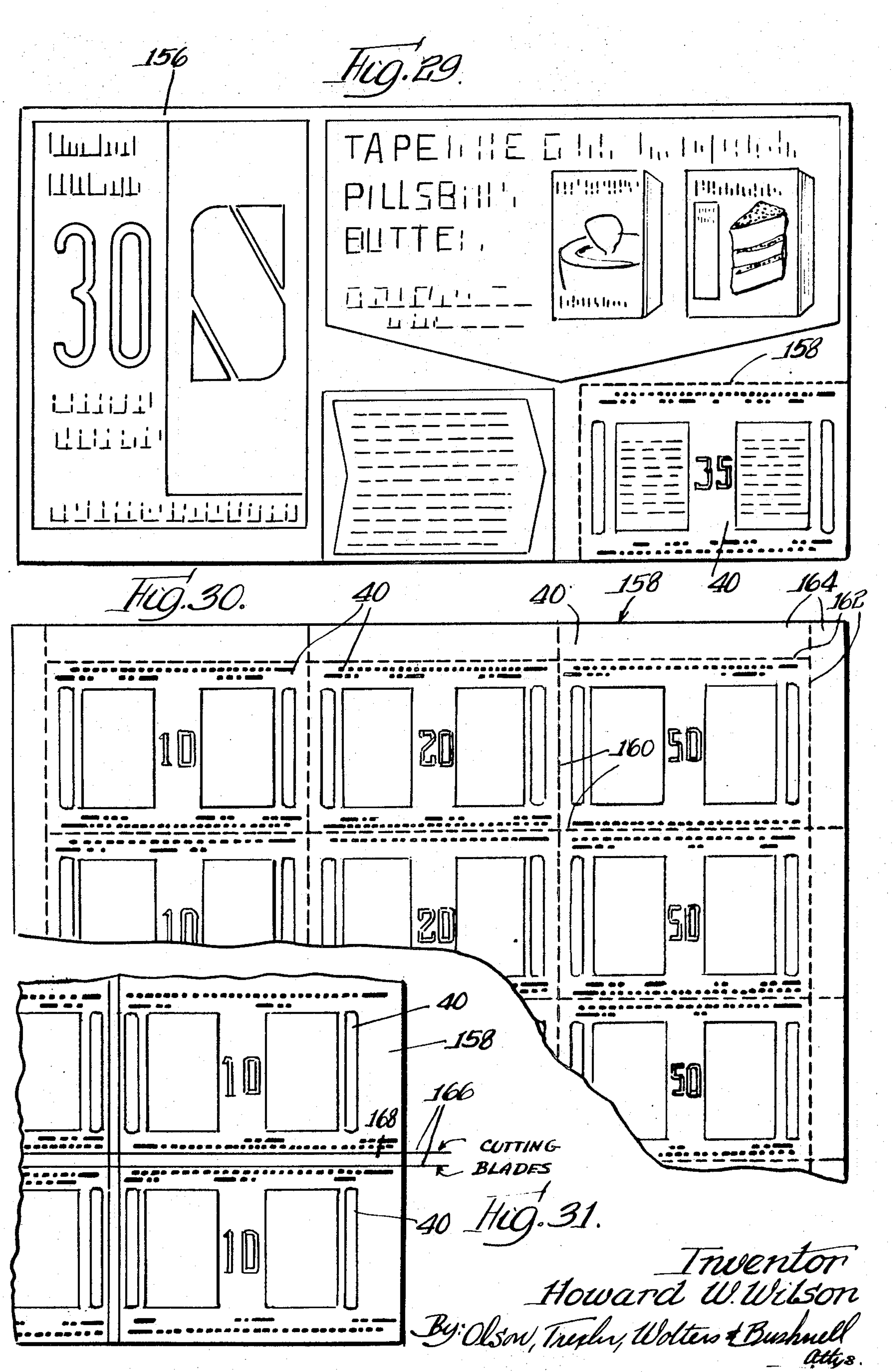
FIG. 29 is a plan view of a sheet or paper in the nature of a handbill having a coupon in accordance with the present invention formed as an integral part thereof.

FIG. 30 is a fragmentary plan view of a sheet of paper showing the impression of a large number of coupons in accordance with the present invention formed thereof; and FIG. 31 is an enlarged perspective view of a portion of the sheet of FIG. 30, showing separation of the coupons therefrom by a "double-knifing" technique positively to preclude carrying of a portion of the code from one coupon over onto another coupon.

Figures 1, 2, 3, 4, 5, 6:
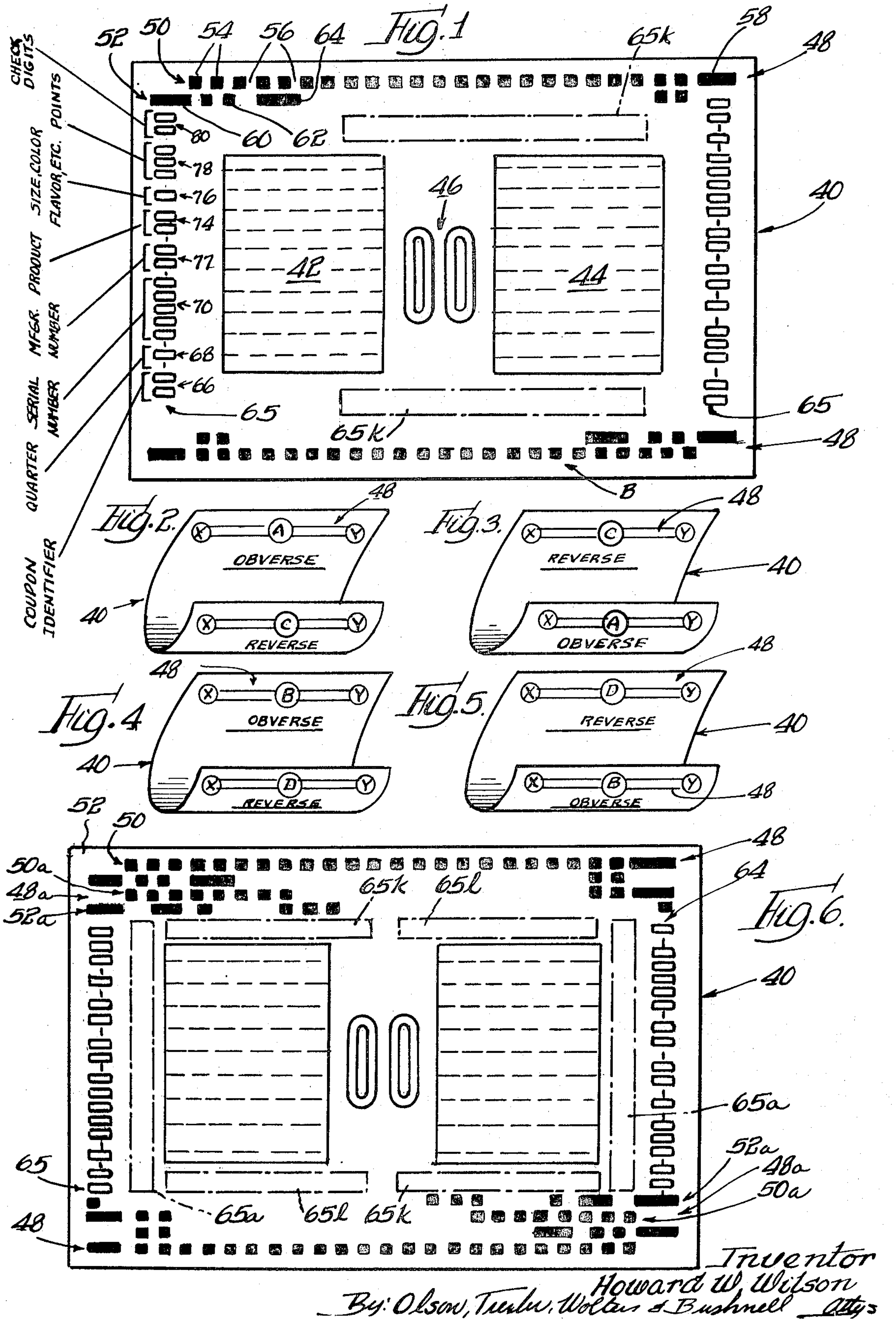
FIG. 1 is a plan view of a merchandising coupon produced in accordance with the principles of the present invention.
FIGS. 2–5 are views similar to one another in perspective, showing the coupon curled over more or less along its longitudinal centerline to show various combinations of positions of codes thereon.
FIG. 6 is a plan view of a coupon similar to FIG. 1, showing the addition of further code tracks during the handling or processing of the coupon.

Turning now in greater particularity to the drawings, and first to FIG. 1, there is shown on a substantially enlarged scale the face of a coupon 40 constructed in accordance with the principles of the present invention. The coupon is of rectangular shape, and one commercial coupon is 2¼ in. long and 1½ in. wide. Printed information relative to the coupon and redemption thereof is applied to the face of the coupon in the areas generally indicated by the numerals 42 and 44, and figures are provided in Arabic numerals at the center of the coupon as indicated at 46 showing the point value of the coupon. Normally this would be in multiples of five, but for sake of example, the numeral indicated is 00.

Along either long edge of the coupon there is provided a code track 48. The code tracks are identical, but run from opposite ends of the coupon. That is to say, if consideration is given to the top track 48 in FIG. 1, and the coupon is then rotated 180° about the 00 in the center, the previously lower track 48 will now be at the upper edge and will be seen to be identical with the track initially at the upper edge. Each track 48 comprises two rows, namely, a first or outer row 50, and a second or inner row 52. The outer row comprises a series of alternating contrasting portions, which, in the preferred example now under discussion, comprises a series of black squares 54 alternating with interspaced white spaces 56 of equal dimension with the black squares longitudinally of the coupon. At the right end of the row 50 there is an elongated black rectangle 58 which serves as a stop signal to indicate that the entire code has passed through the computer reader.

The second or inner row 52 starts with a black rectangle 60 which serves as a start signal for the computer reader. The second row 52 further comprises a series of black squares 62 which may correspond positionwise with the squares 54 of the first track, or with the spaces 56 thereof. Furthermore, the squares 62 are not necessarily spaced apart, but may run together to form an elongated rectangle such as indicated at 64. The first row 50 serves as a clocker or timer track, while the second row 52 has bits of information in a binary code, as will be explained in somewhat greater detail hereinafter. At the moment, the important thing to bear in mind is that the track 48, consisting of the two rows 50 and 52, has machine-readable information, particularly information that can be read optically by a computer scanner.

In addition, the coupon is provided along its shorter edges with human-readable or machine-readable numeric or alphanumeric or symbol information 65. This information is provided at both ends of the coupon, so that the coupon can be read by a human or by machine in either direction, just as the coupon can be read by a machine along either edge. FIG. 1 should be rotated 90° clockwise for a further explanation and full understanding of the human-readable information track 65. The rack 65 comprises a series of characters in the nature of Arabic numerals, and/or letters of the alphabet and/or other symbols occurring in groups. Zeros again are used for exemplary purposes, although an actual coupon would have different digits, letters, or symbols thereon. The first group is a two-position group identified by the numeral 66, and providing information identifying the coupon. The next group 68 is a single-position group, and indicates the quarter of the year in which the coupon was issued. Following that is a five-position group 70 indicating the serial number of the coupon. This is followed by a two-position group 72 giving a code number as to the manufacturer of the product with which the coupon is disseminated. The next group 74 is a two-position group indicating the product with which the coupon is disseminated. There is then a one-position group 76 indicating information such as size, color, flavor, etc. of the product with which the coupon is disseminated. This is followed by a three-position group 78 indicating the number of points (value of the coupon). Finally, there is a two-position group 80 consisting of check digits or other reconstruction symbols or characters.

180° rotation of the coupon about the center brings the opposite human-readable track 65 to the top, and it can be read in exactly the same fashion at this time. As will be appreciated, if the coupon is in undamaged condition, the coupon will be read by the optical scanner forming the input to a computer along either of the long edges. If one edge is damaged, the other edge can be read. If both edges are damaged to the extent that they cannot be read by a computer, then the human or a different kind of optical or electronic reader or program will read either of the two tracks 65. It will be apparent that a very substantial mutilation of the coupon is necessary before one of the four edges cannot be read. Furthermore, if tracks are dissimilarly mutilated, part of the information can be read from one track and part from another. In addition, as will be set forth hereinafter, there is a certain redundancy in the code which permits machine reading and data regeneration to a considerable extent, even in the event of mutilation of either the optical machine language in 48 or the other readable tracks 65.

Also in FIG. 1 are shown two of the possible alternate positions **65*k* for the location of the human-readable numeric or alphanumeric or symbol information 65 as related to the machine-readable code track 48. In those cases where an audit trail is desired on microfilm for example, the shutters and/or mirrors and/or transports may be adjusted in such a way that the picture or resulting image would include not only the optical machine language track 48 but also the data contained in 65*k*. Then, not only would it be possible to humanly read these data 65 or 65*k*, but a programmable microfilm scanner for example could be so programmed as to move from track 48 to 65*k* when desired either for reading, checking, data regeneration, or special auditing purposes. The explanations of the detail concerning data track 65 referred to above are all applicable with regard to 65*k* except for the location. The 180° rotation explanation also applies as shown in FIG. 1 where the track 65*k*** is shown inside the data tracks 48 and with the same left-to-right orientation.

In the preferred form of the coupon as just discussed in connection with FIG. 1, the optical machine language and machine-readable code is along either longitudinal edge thereof, and the code is in reverse order, so that as long as the coupon is face up, either edge can be delivered to the scanner for reading. Indeed, it is contemplated that the coupon need not be face up, and that a mere arrangement would be used so that the computer scanner would read whichever edge was presented to it, whether face up or face down. In the event of microfilming, as referred to hereinafter, a mirror arrangement would also be used to allow the adjacent edge to be microfilmed regardless of whether the coupon would be face up or face down. Other arrangements of the code tracks are contemplated, and these are shown in FIGS. 2–5.

In the embodiment of the invention as described in connection with FIG. 1, both of the information-bearing tracks are on the front, face, or observe side of the coupon, which might also be considered to be side 1. For further purposes of identification, the upper track 48 in FIG. 1 is labeled as position A, while the lower track is labeled as position B. In FIG. 2, one code track is provided in the A-position on the obverse face of the coupon 40, reading from end X to end Y. The second track is provided on the reverse face in position C, also reading from end X to end Y, whereby the data track in either of these two positions may be read.

The coupon of FIG. 2 is shown turned over in FIG. 3, whereby the track C is shown at the top on the reverse side, while the track A is shown at the bottom on the obverse side. Both tracks again are read from left to right, i.e., from X to Y.

In FIG. 4 the tracks are shown as applied in two different positions, being at position B on the obverse side, and at position D on the reverse side, the tracks again being read from X TO Y. The coupon of FIG. 4 has been turned over in FIG. 5 to show the track 48 in position D at the top of the reverse side, with a track 48 also shown at the bottom of the obverse side in position B, reading continuing to be from X to Y. As will be appreciated, in each instance the reading could be from Y to X, and the important thing is consistency, since the scanner or computer reader can be set up to read with equal facility in either direction. It further will be appreciated that data could be placed in all four track positions, or in three track positions in four combinations, namely positions ABC, ABD, ACD, or BCD. It further is contemplated that only one of the track positions could be used, thereby leaving more space for label information, or for advertising or merchandising information.

Each of the positions in accordance with FIGS. 1–5 has certain advantages and disadvantages for printing and encoding which may be dependent upon the time and degree of printout or computer control preparation of the documents, the kinds and types in physical properties of the paper, plastics, film, or other carrier of the information, as well as the intended use and method of reading or recording or microfilming the data and information on the coupon or document. For example, where showthrough is an important consideration, it may be desirable, or even mandatory, that the information track be in no more than two positions, such as shown in the figures. In other uses it may prove best to position the data in only one location. In another usage, if there should be tracks back to back, such as in the A- and D-positions, or the B- and C-positions, in a two-position, three-position, or four-position arrangement, it would be necessary for the back-to-back tracks to be lined up perfectly with one another, and with one of the tracks to run in the opposite reading direction from the other. Obviously, this presents formidable problems, and back-to-back track positions should be contemplated only with an opaque paper or the like.

It has been mentioned heretofore that the coupon is not only coded before dissemination by a manufacturer with his product, but also is capable of being further coded during handling or processing, to indicate what disposition has been made of the coupon or of the order, or for use in inventory control, etc. Thus, with reference to FIG. 6, the coupon 40 will be seen to be identical with the coupon discussed in connection with FIG. 1, except that slightly greater space is provided between the tracks 48 of the machine language readable code and the human- or machine-readable code 65. Thus, at an appropriate time during the handling of the coupon, another pair of information-bearing tracks **48*a* is added, comprising a clocking or timing row 50*a*, and an information-bearing row 52*a*. A coupon such as that in FIG. 6 will be instantly recognizable as having been handled, and hence not subject to presentation for further credit, for example. Furthermore, the additional track 48*a*** provides machine language readable data indicating, as noted heretofore, what has happened to the coupon, where it has been handled, or for inventory control, etc.

Similarly to FIG. 1, in FIG. 6 additional appropriate information in human-readable or machine-readable numeric or alphanumeric or symbolic characters can provide comparable information for track **48*a* in 65*a* or 65L as was done for track 48 in 65 or 65*k***.

Also in FIG. 6 are shown two of the possible alternate locations for tracks 65 and **65*a* in the dotted areas designated as 65*k* and 65L**.

It is not essential that an additional clocking or timing row **50*a* be provided as in FIG. 6. Thus, in accordance with FIG. 7, the coupon is identical with that in FIG. 6 at its inception, and a second information-bearing row 52*a* is added during a stage of handling, with this row being correlated for reading against the initial timing or clocking track. This requires somewhat more precise positioning of the coupon for the subsequent printing, since in FIG. 6** the two additional rows are applied at the same time, and their relative positions depend on the printing equipment, rather than on the position of the coupon.

Figure 7:
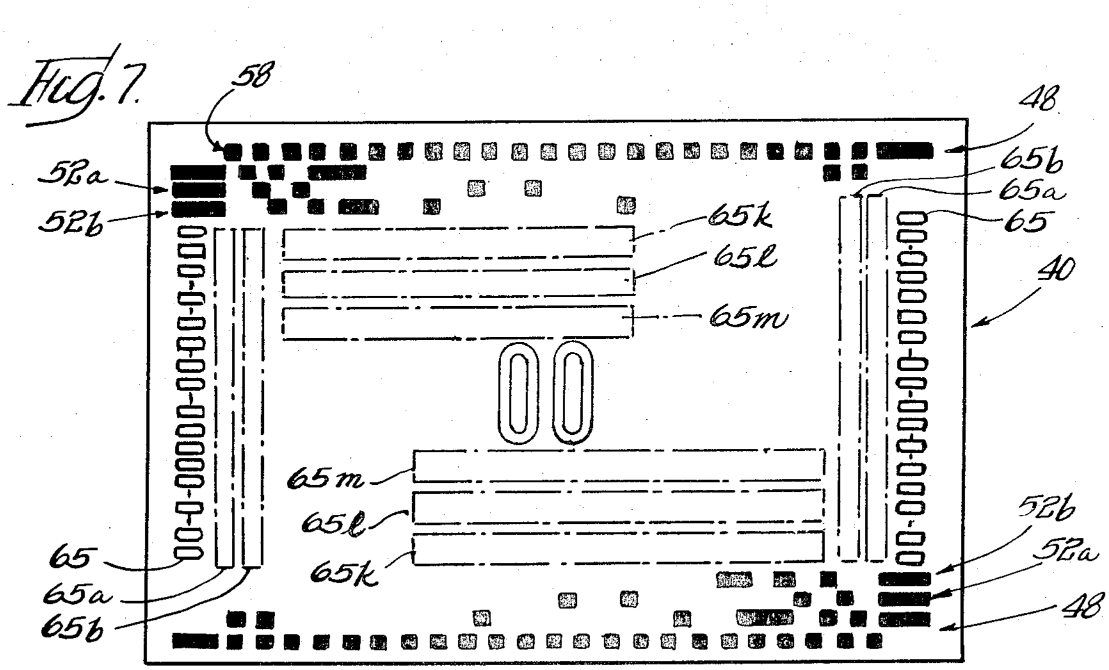
FIG. 7 is a view similar to FIG. 6, but with the additional information added in a somewhat different form.

However, the coupon of FIG. 7 presents advantages in space saving, and, in particular, enough room is left for yet a third information-bearing row 52*b*, so that still further information can be added at a later time during processing. As will be apparent, provision can be made for adding more than two rows of information-bearing data at a variety of different times during the handling and redemption of the coupon, either with new timing or clocking tracks being added each time as in FIG. 6, or relying on the initial timing or clocking row as in FIG. 7.

Similarly to FIGS. 1 and 6, additional appropriate information in human-readable or machine-readable numeric or alphanumeric or symbolic characters can provide comparable information for data row 52*a* with 65*a* or alternate locations such as 65L and for data row 52*b* with 65*b* or alternate locations such as 65*m* as shown in FIG. 7.

In FIG. 7 are shown additional alternate locations for tracks 65, 65*a*, and 65*b* in the dotted areas 65*k*, 65L, and 65*m*.

Figure 8:
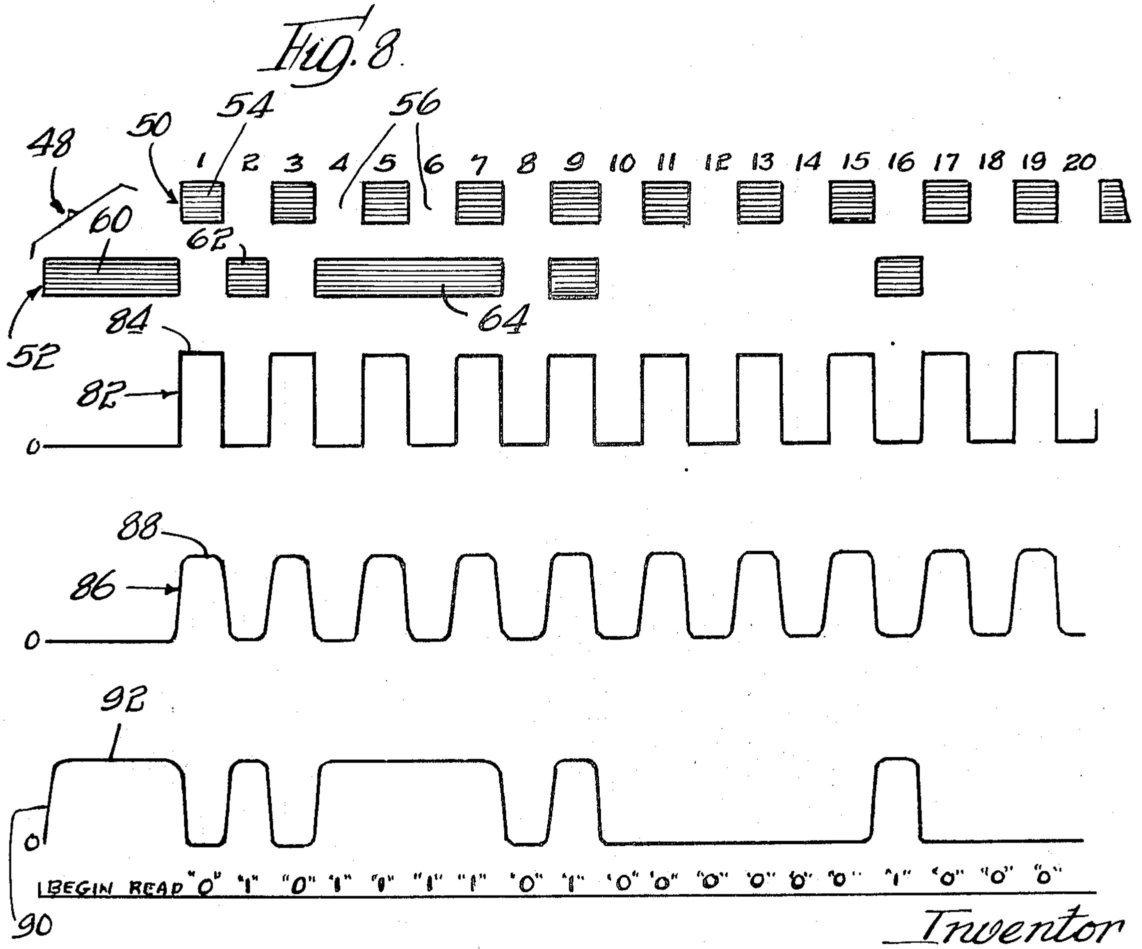
FIG. 8 is a schematic or graphic representation of the coded track or rows accompanied by an illustration of the binary code, particularly as a nonreturn-to-zero code.

One of the advantages of the present information-bearing track, as heretofore mentioned, is that the binary code is a nonreturn-to-zero code. With reference to FIG. 8, the track 48, and specifically the timing or clocker row 50 thereof, consists of alternating contrasting portions, specifically the black squares and white spaces. The first square is indicated as position 1 (or perhaps more accurately time instant). The ensuing blank space is position 2, while the next black square is position 3, etc. When the timing or clocking row is read by an optical scanner, the output thereof, as read on a cathode-ray oscilloscope, would be a square wave as indicated at 82 in FIG. 8, alternating between zero position and a maximum position 84 if the black squares were perfect squares.

However, as will be appreciated, paper does not have an absolutely uniform and level surface. As viewed in a microscope, the surface of a sheet of paper comprises a series of fibers having high spots and low spots. More ink is deposited on the high spots than on the low spots, and there are differences in the wetting or wicking of the fibers in the paper, whereby the edges of the black squares are rather ragged when viewed on an enlarged scale. Thus, the actual wave of the scanned timing or clocker track is not a perfect square wave as indicated at 82, but rather is somewhat in the nature of a flat-topped sine wave 86, varying between zero position and a maximum 88, the curve starting up and starting down more or less along the leading and trailing edges of the black squares. As will be appreciated, the wave 86 returns to zero after each maximum, and hence the row 50 is a return to zero row.

The output of the scanner as read from the data- or information-bearing row 52 is shown at the bottom of FIG. 8, comprising a somewhat irregular curve 90 varying from a zero line to a flat-topped maximum at 92. Like the wave 86, this curve would be ideally comprised of vertical and horizontal lines meeting at right angles, but, like the curve 86, is somewhat tapered off at the start and stop of the rectangle 60, squares 62, and rectangles 64. Thus, there is a rather broad hump in the curve 90 corresponding to the rectangle 60, and this indicates to the computer scanner that it should begin reading. Opposite the first position, where there is a square 54 in row 50, there is a blank space in row 52. Thus, the curve 90 is at the zero line, as will be seen. Accordingly, the blank in row 52 comprises a bit of information which is read and handled by the computer as zero in a binary system. Immediately thereafter, the square 62 is encountered, which produces a rise in the curve 90 to the maximum level, and this corresponds to position 2 indicated above row 50. Thus, this is scanned and is read by the computer as a 1. The curve then drops to zero, but thereafter it goes back up to 1, and stays at 1 for four positions, corresponding to the rectangle 64. Thus, four successive bits of information are read as 1, with no necessity of returning to zero between the ones. Thus, the row 52 comprises a nonreturn-to-zero binary system, and a great deal of information can be encoded in a relatively small space.

It will be appreciated that these data could be interpreted in a manner opposite to that described above, where the high point 92 or the black square 62 would be designated with the binary value of 0, and the low point or zero would be designated with the binary value of 1.

Figures 9, 10, 11, 12:
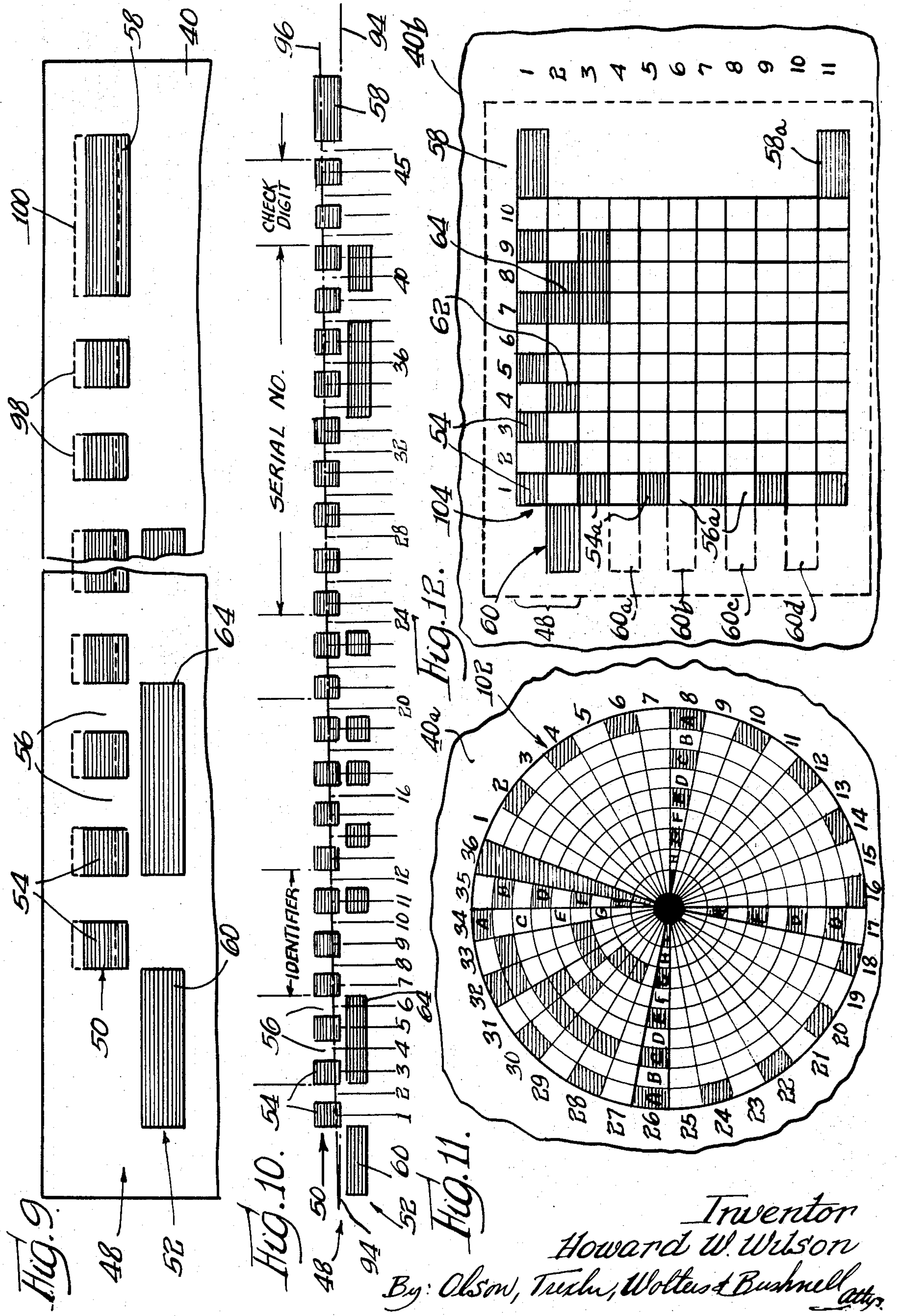
FIG. 9 is a fragmentary view on an enlarged scale, part being broken away, of the code track portion of a merchandising coupon produced in accordance with the present invention.
FIG. 10 is a view on a somewhat less enlarged scale of the code track with identification of the binary bits thereon.
FIG. 11 is a plan view of a portion of a coupon with a circular code track thereon incorporating the principles of the present invention.
FIG. 12 is a view of a fragment of a coupon utilizing a square or other rectangular code track constructed in accordance with the principles of the present invention.
Figure 13:
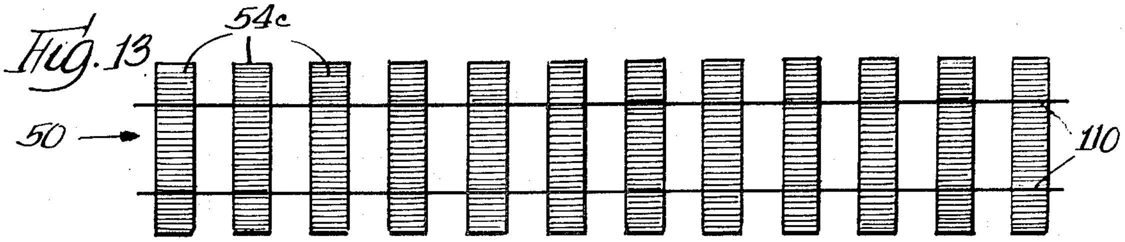
FIG. 13 shows, on an enlarged scale, a modification of one of the rows of the code track.

The code 48, along one edge of the coupon, is shown in FIG. 9 on a greatly enlarged scale. As noted heretofore, the first rectangular section 60 of the row 52 comprises a start indication, while the rectangle 58 at the trailing end of the row 50 serves as a stop indicator. The contrasting portions 54 and 56 of the first row, and the contrasting portions of the second row are necessarily shown in black and white, and this is a preferred rendering of the invention. That is to say, the squares 54 and the squares 62 and rectangles 64 in a preferred embodiment of the invention are printed in black ink on white paper, although it is contemplated that other material could be used. The paper or other material generally will have a minimum thickness exceeding 0.002 in., and will have a reflectivity preferably not less than 70 percent, and an opacity preferably not less than 60 percent before printing on the paper. The paper should have a substantial tensile or tear strength, preferably not less than 40 grams in both directions at 90° from each other, when measured against 16 sheets of paper samples 2.5 in. wide. The 40-gram measurement represents resistance to tearing. However, it will be appreciated that the paper or other backing material could be of a color other than white, while the squares ad rectangles could be of a color other than black, the ultimate necessity being contrast between adjacent portions. In fact, the reflectivity as just noted as well as the opacity are not in every instance necessary. Thus, for example, rather than relying on reflectivity and opacity, the code could rely on transparency of the coupon base, with substantially total opacity in the square and rectangle areas to interrupt transmission of light, with the light source being on one side of the coupon and the pickup on the other side for direct reading, or with the light source on one side and a microfilm on the other side for microfilm reproduction. It is also within the contemplation of the present invention that the code could be printed with invisible ink which would not be seen by the eye, but which would reflect (or block transmission, as the case may be) light of an appropriate wavelength.

It will perhaps be somewhat more evident in the enlarged scale of FIG. 9 that the square or rectangular shapes in the track provide for near optimum compaction of the respective portions of the rows. By way of example, each of the squares, such as 54, may be approximately 0.040 in. square. This is large enough to allow approximate 20:1 reduction when photographing the tracks on microfilm.

Part of a suggested code will be seen in connection with FIG. 10. Thus, for example, the bits in row 52 from positions 7 through 12 may serve as the identifier, just as does the human-readable code sections 66. Similarly, from bits 25 through 41 the information may comprise the serial number, while check digits will be found from bits or positions 42 through 46, there being a total of 46 positions. This is set forth merely by way of suggestion, and other combinations can be used, and additional information will appear in the spaces not specifically identified, such as the manufacturer's number, product, size, color, flavor, etc.

It is not desirable, but it is entirely possible, that there might be a certain degree of skew in the track 48, either due to printing errors or to skewing of the coupon itself during reading or during microfilming thereof. In FIG. 10 there will be seen a horizontal line 94 which is parallel to the longitudinal centerline of the coupon, and intended to lie along the bottom edge of the squares of the row 50 (it will be understood that this line is used only by way of explanation, and does not appear on the actual coupon). A broken line 96 is indicated to show a degree of skew that can be encountered from the start rectangle 60 of the row 52 through the stop rectangle 58 of the row 50, with the line 96 still remaining within the rectangle 58. Within the narrow angle indicated, the computer input will read the rows of the track properly, regardless of whether it is direct reading or by microfilm.

Similarly, an entire row may be laterally offset, as through a printing area, and this is suggested by the broken line offset squares 98 and rectangle 100 of FIG. 9. It will be observed that as long as the degree of offset or the angle of skew is such that there is an overlap of the code markings with the intended position, the scanner will read the code.

Similarly, one or more entire rows might be vertically offset through the addition of tracks 48, such as in FIG. 6, in rows 48*a* and 52*a*, or as in FIG. 7 with the addition of data rows 52*a* and 52*b*. Because of the relative positions of start bars 60 in rows 52, 52*a*, and 52*b* as they relate to the clocker row 50 and the stop or end bar or rectangle 58, the correct positioning or reading of the data bits in relation to the clocker positions is assured.

Heretofore reference has been made only to a rectangular coupon, and to a rectilinear information-bearing track. It is also within the contemplation of the invention that the coupon might be of other shapes, or have tracks of other shapes. Thus, in FIG. 11, the machine language information track is shown in the nature of a circle. In FIG. 11, the X-, Y-coordinates are of a curvilinear nature, and the following explanation of FIG. 11 makes one such coding and encoding method clear. The circle may be the entire dimensions of the coupon, in which case the coupon would be circular, or the track could be a part of a larger coupon as indicated at 40*a*. It will be understood that human-readable or machine-readable character information is also provided. This may be on the same face of the coupon as the circular code, or if the circular code occupies the entire face of the coupon, then the human-readable or machine-readable character information would be on the backface. Other printed material, such as promotional material for the manufacturer in disseminating the coupon, would appear either on the front face or backface, depending on the space available.

The preferred embodiment of the circular pattern shown in FIG. 11 has annular separations between the indicated rings A through I to prevent printing "bleed" and to provide reading segregation.

The circular code track 102 comprises 36 sectors indicated around the outside of the circle as 1 through 36. The circle is further subdivided by nine circles of progressively decreasing diameter coacting with the segments to produce a total of nine rows of areas closely approximating rectangles. Sector 36 is completely blacked in or otherwise opaque, while section 1 is completely blank or white, whereby the computer reader or scanner will recognize the coupon as being right side up, and will recognize where to start reading. It will be understood that this condition could be reversed as to black and white, and that previous comments apply as to reading by reflected light or by transmitted light, etc. It further will be understood that the particular number of sections and the number of decreasing diameter circles is set forth by way of illustration only, and that other numbers could be used.

The outer ring of rectangles comprises alternate contrasting sections, herein illustrated as white and black, and this ring serves as a clocker ring or row, directly equivalent to the row 50 in the embodiment of the invention heretofore shown and described. Successively inner rows or rings comprise information-bearing rows, and in the upper left corner certain of these are blacked in to indicate a specimen code. The rows or rings are successively indicated as A (the clocker or timing row) through I for identification.

It will be noted that sectors 8, 26, and 34 have rectangles blacked in in rows or rings A, C, E G, and I, while sectors 17 and 35 have the alternate rows or rings blacked in, namely B, F, and H. As will be understood, the outer or clocker or timing ring is used at all times for the timing of the computer, and that row or ring B is first read as to information, whereupon the computer then steps in to row or ring C, etc. The alternate blacked in rectangles in sectors 8, 26, and 34 serve as odd-row, clocker-locaters (bearing in mind that rows A, C, E, G and I are the odd rows), while the blacked-in rectangles in sectors 17 and 35 serve as even-row clocker-locaters. The information in these clocker-locater sectors is used to cause the information reader of the computer to step in one row each time it has completed one revolution.

It will be appreciated that a great deal of information can be placed on the circular track of FIG. 11. It is contemplated and preferred that when the coupon is first prepared, only a few of the outer rows should have information coded therein. Thus, space is left for subsequent coding to be added during the handling of the coupon, as discussed heretofore.

The code can also be arranged in the form of a "square" 104 as indicated in FIG. 12. Again, this may comprise the entire face or obverse side of a coupon, or it may comprise a smaller part of a coupon 40*b*. In the preferred embodiment of this square configuration, spacing rows will be provided both horizontally and/or vertically, as the case may be, between adjacent rows of indicia to prevent printing bleed and to provide reading segregation. In FIG. 12 the X-, Y-coordinates have been expanded further than in FIGS. 1, 6, and 7 in a perpendicular manner, rather than a curvilinear manner as shown in FIG. 11. The manner of doing this deserves special attention. The basic document or coupon in track 48 and 52, 52*a*, and 52*b* includes design elements which specifically provide these location points in rows 50 and 52 through the proper juxtaposition of the clocker contrasting areas 54 and 56, the begin signal device 60, the data bits 62 and 64, and the end signal device 58. The same principles hold true in those illustrations showing more than one track as in FIGS. 6 and 7. Now in FIG. 12, because of the need for proper location points to identify the X-, Y-coordinates regardless of the orientation and whether or not the material might be transparent and either right or wrong side up, the combination of row 1 with its alternating black squares, and column 1, also comprised of alternating black squares, plus the start bar 60 and the end bars 58 and 58*a*, provide the necessary parameters. Column 1 has alternating contrasting portions reading down, as will be seen, properly to identify the rows and/or to signal the computer to drop down one row each time for reading information. Except for column 1, all of the rows below the first are information-bearing rows, and, as previously discussed, preferably some of the lower rows are left blank initially for addition of information during processing or handling of the coupon. The 11 rows and the 10 columns are only by way of illustration, and other numbers could be used. As in FIG. 6 and FIG. 7, start bars may be repeated in one or more positions as indicated by the dotted lines 60*a*, 60*b*, 60*c*, 60*d*, and 60*e* in FIG. 12. Similarly, additional end bars comparable to 58 and 58*a* may also be added, as is demonstrated by 48*a* in FIG. 6, or these additional end bars may be omitted with the exception of end bars 58 and 58*a* as is illustrated in tracks 52*a* and 52*b* in FIG. 7 and as shown in FIG. 12. Where additional end bars are added, the most desirable form of this variation demands that the bit position in column 10 of FIG. 7 ahead of such additional end bar in any given row should remain white or an otherwise contrasting color.

Previous comments as to reading by reflectivity, or transmission, addition or deletion of extra clocker and data rows, start and stop bars, etc. apply. A human-readable code also would be applied, as discussed heretofore, and would be either on the obverse or the reverse face, depending on the space available and the opacity of the document. It is also contemplated that additional material, such as in the nature of promotional material, would be printed on the obverse or reverse face, depending on available space and other pertinent considerations. The grid would not have to be lined in as shown, and in some instances the gridlines would best be omitted, leaving the black squares and rectangles for clocking and position of data rows, plus the information in the data rows themselves.

In each instance heretofore, the code indicia have comprised squares, either spaced (as they always are in the clocker or timing row or run together to form horizontally elongated rectangles (as they sometimes are in the information-bearing rows). Although this shape is preferred, it is not essential.

Various different row configurations are illustrated in FIGS. 13 through 19. Thus, referring first to FIG. 13, part of a modified row **50*c* is shown, and the areas 54*c* therein comprise vertically elongated rectangles. Two horizontal lines 110 may be printed across these rectangles in black or colors, and these may be used in the scanner to control or correct for skew. They also are useful for consumer identification, since the lines across the rectangles somewhat resemble a railroad track. But these horizontal lines 110** are not essential to this shape, and may or may not be used.

Figure 14:
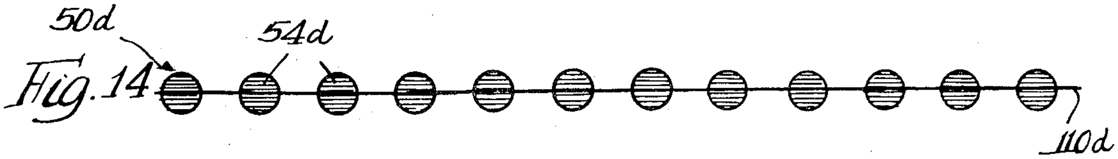
FIG. 14 is a view similar to FIG. 13 showing another modification.

A further modification of the code is shown in FIG. 14. In this figure a modified row **50*d* is shown, and the code indicia in this instance comprise black circles 54*d*. One horizontal line 110*a* may be printed across these circles in black or a color, and may be used on this modification to help control or correct for skew in the scanner or computer input. As in the case of FIG. 13**, this line may also be used for consumer identification since the clocker row would then resemble a string of beads or pearls.

Figure 15:
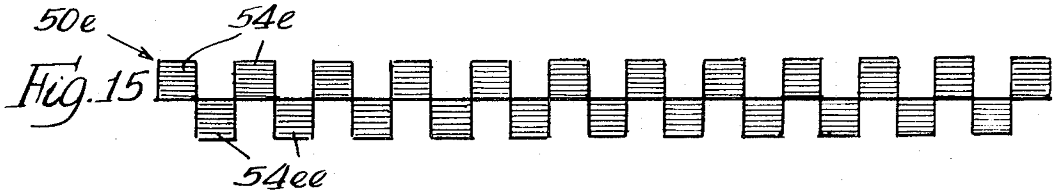
FIG. 15 is a view similar to FIGS. 13–14 showing yet another modification.

Yet another modified row **50*e* will be seen in FIG. 15, and in this embodiment the indicia are in somewhat of an alternating checkerboard design. Specifically, the indicia comprise black squares 54*e* in the odd-numbered positions, exactly as in the preferred embodiment. However, and vertically immediately contiguous thereto, there is a second row 54*ee* in the even spaces, whereby there are alternating upper and lower squares. Thus, two clocks or timers can be operated alternatively or simultaneously. With this double-clocker row it would in some cases give a better "fix" or location of multiple-data rows 52*a* and 52*b* as in FIG. 7**. Or the data row or rows could be placed between such alternating clocker rows; or it could be used for better consumer identification as a checkerboard border, for example.

Figure 16:
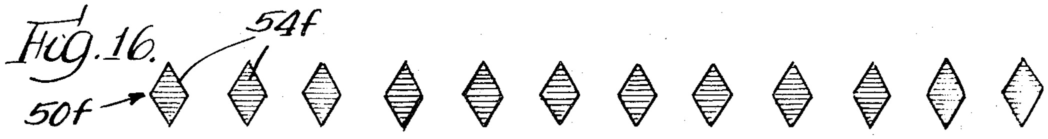
FIG. 16 is a view generally similar to FIGS. 13–15 showing a further modification.

Referring now to FIG. 16, a further modification includes row **50*f*, wherein the code indicia 54*f*** are in the nature of diamonds, shown as slightly elongated vertically, although the elongation could be horizontal, or the shape could be that of squares turned 45° to stand on their corners. As in all previous embodiments, the spaces between are white.

Figure 17:
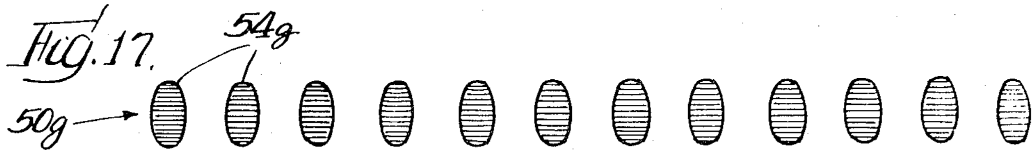
FIG. 17 is a view generally similar to FIGS. 13–16, showing yet another modification of the code indicia; pp

Yet another modification is shown in FIG. 17, and in this instance the clocker or timing row **50*g* comprises a series of vertically elongated ellipses 54*g***. The intervening spaces again are of contrasting nature, or example, white.

Figure 18:
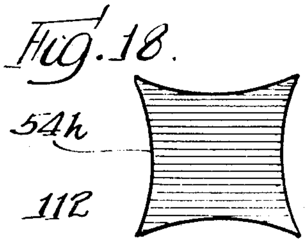
FIG. 18 is a plan view on a greatly enlarged scale showing a shape modification of one of the code indicia which might be produced either purposely or accidentally.
Figure 19:
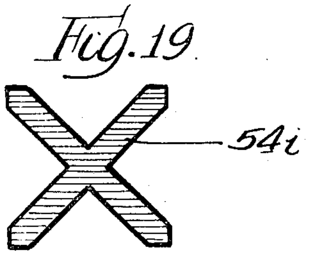
FIG. 19 is a view on the same scale as FIG. 18, showing a further modification of one of the information-bearing indicia.

In FIG. 18, only one of the contrasting indicia **54*h* is shown. This is in the nature of a square with concave sides 112. This concavity may be considered in several aspects. On occasion, what is intended to be a square may come out as a concave side square as shown in FIG. 18**, due to characteristics of printing ink and paper or the like. However, more typically, a square may be printed in somewhat concave shape as shown, so that, upon spreading of the ink, a nearly perfect square will result. On the other hand, the concave square can simply stand on its own as another modified shape of indicium.

A further modification is shown in FIG. 19, again of but a single indicium **54*i*, this time in the shape of a cross, having the corners somewhat pointed as at 114 so as to fit within the outline of a square. As will be recognized, this is similar to the concave square of FIG. 18**, carried to an extreme.

Figure 20:
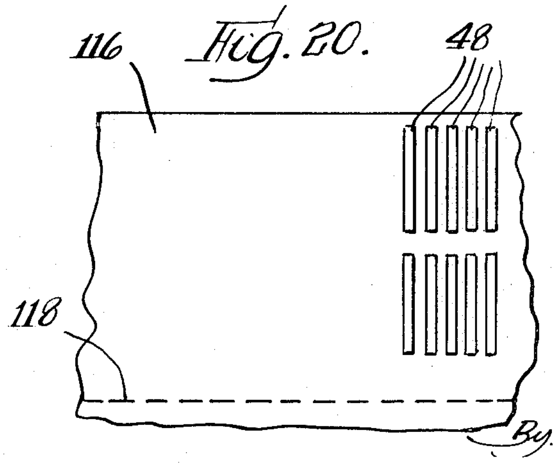
FIG. 20 is a fragmentary view of a section of microfilm showing the manner in which the coupon tracks are photographed thereon transversely to the axis of the film.

Reference heretofore has been made to the fact that the coupon as shown and described herein can be read directly by an optical scanner to form the input to a computer. It also has mentioned that preferably the code tracks of the coupons are microfilmed so that the microfilm image can be read by the optical scanner forming the input to the computer, whereby to allow feed of the computer at an efficient rate without having long idle standby periods of the computer, and without the need for complex or inefficient multiplexing. Thus, with reference to FIG. 20, a greatly enlarged section of microfilm is shown at 116. The longitudinal centerline of the microfilm is indicated at 118. Typically, this would be 16-millimeter film, but could be 8 millimeter, 35 millimeter, or any other known or suitable size film. To conserve film, it is desirable that the entire coupon is not microfilmed, but only that portion of the coupon containing the code tracks 48 thereof, the tracks being located transversely of the longitudinal axis of the film. As illustrated, two or more sets of tracks are provided on either side of the longitudinal centerline of the film, and maximum use is made of the available space on the film, whether it be sprocketed or unsprocketed. In some applications it may be desirable to add characters as shown in FIG. 1 at **65*k*, in FIG. 6 at 65*k* and 65L, and in FIG. 7 at 65*k*, 65L, and 65*m***.

Figure 21:
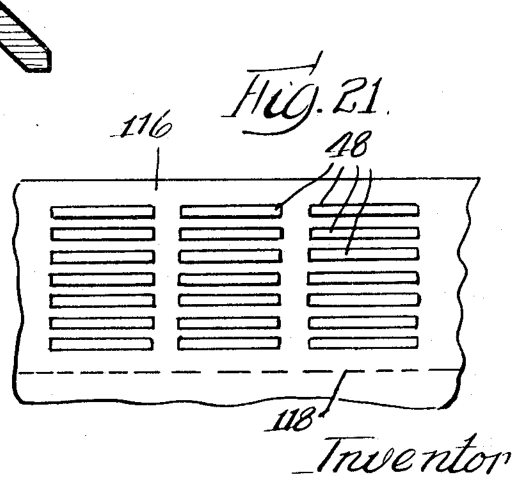
FIG. 21 is a view similar to FIG. 20, but showing the code tracks photographed longitudinally of the axis of the film.

It is not essential that the tracks be photographed with their long directions transverse of the longitudinal axis of the film. As shown in FIG. 21, the tracks 48 are photographed in a direction longitudinally of the centerline 118 of the film 116.

In those applications where it may prove desirable to read both the obverse and reverse side of the coupon or document, special care will be required to determine if the position and direction of the code should always run from left ro right, for example, as indicated in FIGS. 1 through 10. In the case of microfilming individual coupons or documents, the standard practice of check microfilming both the front and back of the check on a single film through the kinds of mirrors and lens systems currently in vogue might preferably require that the code track appear only on the obverse side of the document as shown in FIG. 1, rather than a multiplicity of tracks as indicated in FIGS. 2 through 5, in order that there will be only one code track image on the film and that it will appear in the same left-to-right orientation on only one side of the film rather than giving a double image of the same code track on two sides of the film where the two images are recorded side by side. In a similar case, where the two images (one each of the obverse and reverse sides) appear one over the other rather than alongside each other, the same requirements would be preferred.

Microfilming of the code tracks has an advantage in addition to efficient use of computer time in that the microfilms can be stored for an extended period in a minimum of space, while the original coupons are destroyed.

Each coupon may have a discrete identify, such as has heretofore been described or implied. On the other hand, a coupon may be a part of a larger entity, and for example, in FIG. 22 there is shown a can 120 having a label 122 thereon. This may be a food can, or any other suitable type. A tearout section 124 includes a coupon 40, and this may be seen more clearly in FIG. 23. The tearout section 124 includes both the rectangular coupon 40 and an end tear tab 126. A perforated line 128 surrounds the coupon 40. Additional perforated lines 130 extend in converging relation from one end of the coupon to a die-cut line or slit 132. A knife or fingernail can be carefully inserted between the perforations in the end 132 to pull up the tab 126, and thus to pull the entire tearout section 124 from the label, tearing along the perforated lines 130 and 128. The line 128, surrounding the rectangular coupon, also runs between the coupon and the end tear tab, whereby the tear tab can be removed from the coupon.

Figures 22, 23, 24, 25, 26, 27, 28:
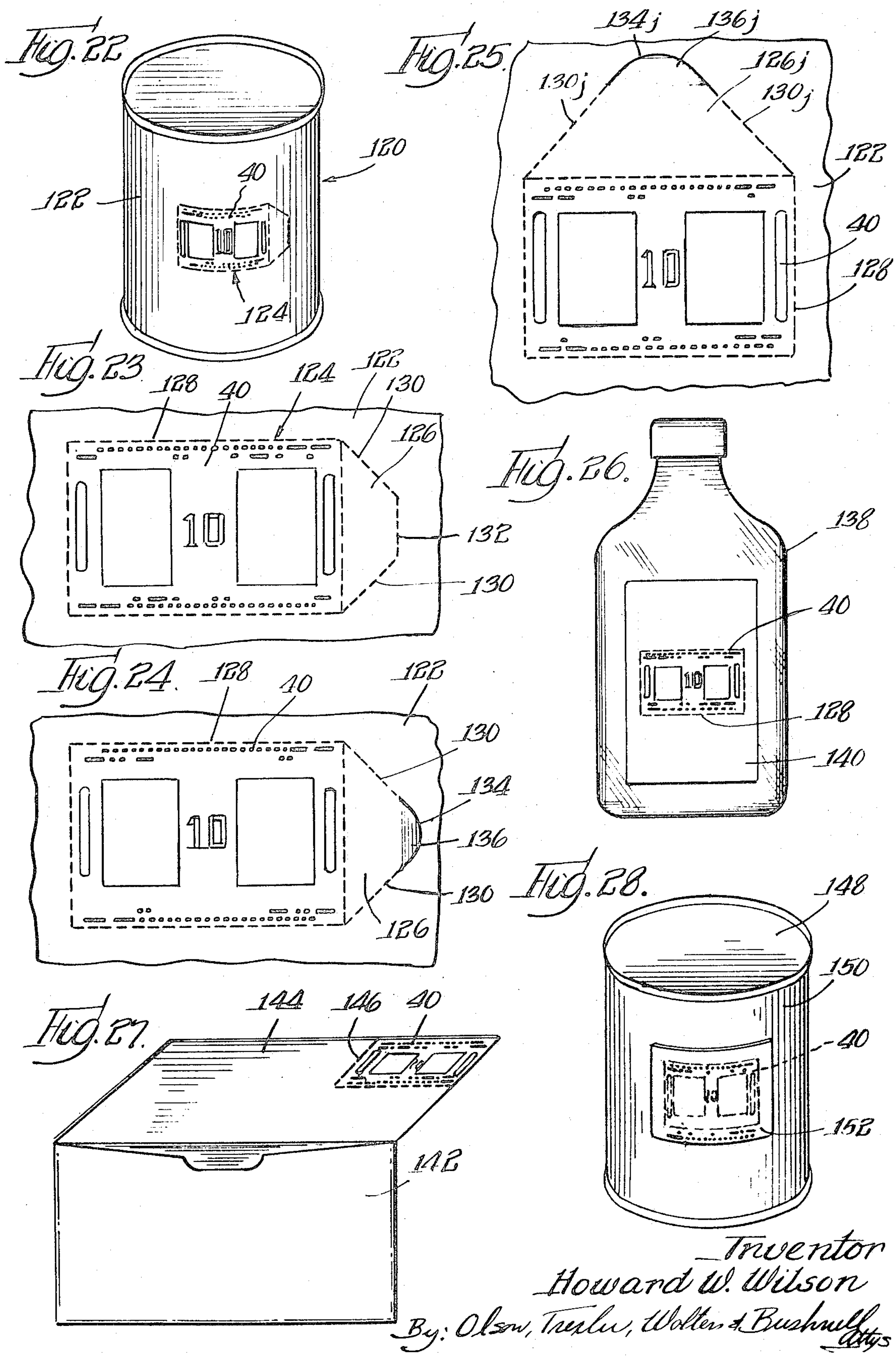
FIG. 22 is a perspective view of a container, specifically a can, with a coupon according to the present invention incorporated as a part of the label thereon.
FIG. 23 is an enlarged view of the coupon-bearing portion of the label of FIG. 22, showing the manner in which the coupon is integral with the label, yet readily removed therefrom.
FIG. 24 is a view similar to FIG. 23, showing a die-cut end portion or tab for facilitating removal of the coupon from the label.
FIG. 25 is a view generally similar to FIGS. 23 and 24, showing a different orientation of the tear tab for removing the label.
FIG. 26 is a view of a container such as a bottle, with the coupon incorporated as a part of the bottle label.
FIG. 27 is a perspective view of a bottle cap liner saver envelope having a coupon in accordance with the present invention incorporated as a part of the flap of the envelope.
FIG. 28 is a perspective view of a can wherein the coupon in accordance with the present invention is secured to the label thereof by a clear plastic adhesive tape.

A modification of the tearout section of FIG. 23 is shown in FIG. 24, most of this figure being identical with FIG. 23, and similar numerals being used. The distinction is that rather than the provision of the perforated line 132, there is an arcuate die-cut line 134, thus defining a flap 136 at the end of the tab or endpiece 126. The flap 136 is more readily engaged by the fingernail than is the slit 132, and thus the tearout piece is more readily removed from the label.

As discussed in connection with FIGS. 22–24, the tab 126 is at the end of the coupon. As shown in FIG. 25, the coupon 40 again forms a small part of the overall label 122, and in this instance, converging perforated lines **130*j* lead from one of the long sides of the coupon, shown as the upper side, to define a tab 126*j*. An arcuate flap 136*j* is provided by an arcuate die-cut line 134*j***, but at the top rather than the end. Removal is identical, as is separation of the coupon from the tab.

As will be understood, a can label is typically applied by use of an adhesive which lies only along the extreme ends of the paper label as it is wrapped around the can, thus appearing only at the seam. Hence, the tearout section, including the coupon, is entirely free of adhesive, and there are no problems of it adhering to the can.

There are other types of labels which do not completely cover a container, and for example, in FIG. 26 there is shown a bottle 138 having a label 140 secured thereon by an adhesive, which adhesive may run along two or more of the four outside edges, but not in the center portion. A coupon 40 is formed as an integral part of the label, in the center portion thereof, and disjoins the remainder of the label by perforated lines 128. Due to space considerations, the label may not necessarily have a tear tab as in the embodiments disclosed in connection with a can label, and hence it may be necessary to use a pointed knife, scissors, or other device to separate the coupon along the perforated line.

One merchandising scheme now in commercial practice involves the saving of the plastic or cork liners from bottle caps, or tokens or other coupon substitutes, or cutouts or tearouts from cartons, for example. A certain number of these must be saved in an envelope which may be provided by the manufacturer, and then returned to the manufacturer or a redemption service for redemption in cash or merchandise. This is an inefficient method of operation. In accordance with one embodiment of the present invention, as illustrated in FIG. 27, an envelope 142 is provided for a saving of bottle cap liners or cutouts, or tearouts, or other tokens or coupon substitutes. A coupon 40 is formed as an integral part of the envelope flap 144, being positioned at one corner of the flap, or demarcated from the remainder of the flap by right-angularly disposed perforated lines 146. When the requisite number of bottle cap liners, etc. has been placed in the envelope, the envelope may be sent or taken to a redemption center where the number of items or the point count might be validated by a quick means, such as weighing, and wherein the coupon would be converted for the use of the party turning in the envelope, being torn from the flap during the process. Obviously, the coupon would have to differ somewhat from normal coupons to keep the saver from simply tearing off the coupon and using it without accumulating the necessary number of bottle cap liners. This can be done by leaving of all or part of the code which would be impressed at the validating station, or by properly coding or coloring the coupon so that it would be accepted only as a part of an envelope having the requisite number of bottle cap liners therein, or which would not count in the computer unless validated either through the use of a matching validating coupon or other electronic keying or source document. In order to facilitate the availability of coupons of varying values so as to permit or encourage saving in greater increments, more than one coupon of either the same or different values could be incorporated in the flap 144.

Attention now should be directed to FIG. 28 wherein another embodiment of the present invention is illustrated. In this instance there is a container 148, such as a can, which may have a label 150 thereon, although the label is not essential. A coupon 40 is secured to the face of the label (or directly to the can, in the absence of a separate label) by a transparent or other adhesive tape or sheet 152. The coupon 40 is treated with a release agent before being mounted on the can label, and accordingly the adhesive of the tape 152 does not adhere to the coupon to any significant degree, although it adheres quite well to the can label. Thus, the purchaser can simply pull the tape from the can label, it being relatively unimportant whether the tape or label is mutilated in so doing. However, since the coupon has been treated with a release agent, it readily is separated from the tape with no damage to the coupon.

The coupon 40 has been shown heretofore as an independent entity, or as part of a label or the like. It is also capable of forming a part of a larger, independent sheet, such as a handbill, mailing piece or advertisement. Thus, in FIG. 29 there is shown a relatively large sheet having various information and advertising indicia as noted somewhat sketchily thereon. At one corner, illustrated as the lower right corner, there is a coupon 40 of rectangular nature such as the one previously described in connection with FIG. 1. This coupon is joined to the remainder of the sheet 156 by a right-angled perforated line 158 to facilitate tearing off of the coupon.

It is contemplated that the coupons as normally disseminated with a product would be of a particular color. The sheet or handbill 156, including the coupon thereof, would be of a different color, whereby the handbill could be distributed in the nature of a promotional bonus with each coupon from a handbill having to be batched with a coupon distributed with a product in order for it to be redeemed. Thus if, for example, the coupons dispensed with merchandise are of a predominantly blue central portion, and the handbill and central portion of the coupon thereof are of predominantly pink color, there would have to be one or more blue coupons turned in for each pink coupon, in order that the pink coupon could be validated within the computer through its matching blue in product coupons just as a box top, actual purchase, or other proof of purchase is now used in premium and merchandising promotion.

In the manufacture of the coupons it would obviously be inconvenient and inefficient to print each coupon separately. Thus, as is shown in FIG. 30, a large plurality of coupons 40 is printed on a single sheet 158 of paper or the like, and severance lines among the various coupons are indicated at 160. There are also severance lines 162 above the periphery of the coupon area, leaving waste areas 164. The severance lines 160 can be perforated if it is desired that a sheet of coupons should be delivered to a consumer, the perforations allowing severance by tearing. Such coupons, with a sheet thereof being delivered to a consumer, would normally be of the matching variety as noted just above, but they could be in the form of extra bonus coupons associated with any purchase or promotion, for example. If the coupons are intended for individual inclusion or attachment to a product for distribution therewith, the perforated likes could readily be omitted, since it is contemplated that such coupons would normally be severed by a cutting implement of one sort or another.

However, if the coupons are to be distributed individually, and are cut apart by the manufacturer, it may be preferred to separate the coupons by a double-knifing technique. Thus, with reference to FIG. 31 there is reproduced a small portion of the sheet 158 having the plurality of coupons 40 thereon. Two closely spaced cutting or slitting blades 166 are used for cutting apart adjacent coupons, leaving a scrap or waste section 168 between adjacent coupons. The reason for this is that the cutting is done on automatic machinery, and slight misalignment or mispositioning of the sheet 158 might cause a part of a code to be cut off of one coupon. If the coupons were not separated by the scrap material 168, then the part of the code cut off might appear on the next adjacent coupon, and cause a false reading in the scanner. However, with the double-knifing technique mentioned in connection with FIG. 31, any such portion of the code that might be cut off inadvertently simply is on the scrap material, and is thrown away.

Various specific embodiments and ramifications of the present invention have now been disclosed. Additional considerations enter in, which are not well adapted to illustration, including protection against counterfeiting. It is within the contemplation of the present invention that there should be protection against counterfeiting, and this includes expedients such as special papers. A common example of this is the bond paper that is used for printing U.S. currency. Obviously, it would be a different type of paper, but it could be counterfeit protected in the same manner. A further protection against counterfeiting resides in the provision of printing in fluorescent inks on the coupons so that they can be checked by the use of fluorescent light of the proper wavelength during machine processing. Indeed, as mentioned heretofore, the entire code can be applied in invisible ink, such as a fluorescent ink, whereby the purchaser will not even be aware of the fact that there is a machine-readable code on the coupon. Different wavelengths of light and pigments can be used in combination either as to fluorescence or color, or both can be used. Additional anticounterfeiting measures include the use of brighteners and the use of trace elements. Any or all of the foregoing can be used to provide start and stop (go and no-go) signals to activate or prevent reading by the computer, and this forms the subject matter of another invention.

It is to be borne in mind that the machine-readable code, 48, **48*a*, 52, 52*a*, 52*b* and in FIGS. 11 and 12 for example, is an optical machine language reading code, sometimes referred to as OMLR, as opposed to optical machine character recognition, known as OMCR, or OCR (optical character recognition), which may be used on the human-readable alphanumeric or other symbols, 64**, as a source of checking or as input to the computers. This merchandising coupon can be best defined perhaps as a general purpose data-bearing optical machine language document for optical or electronic input to computers (OML–DOEIC).

A disclosure has been made herein of a circular code and of a square or rectangular track. It will be recognized that these are well adapted to a coupon that might form a liner for a bottle or jar cap. In such cases it is contemplated that the code information could be printed directly on the liner, and it is also contemplated that it could be printed on the inside of the cap with an ink that would bleed into the material of the liner, such as a plastic material.

Coupons may be disseminated or distributed individually by inclusion in a package. When such a package is of a food or drug product intended for human or animal consumption, it is essential that the paper be essentially sterile, and that the ink be of a type that will have no adverse effect on the contents of the package, or, in the alternative, there are varnishes acceptable to regulatory agencies that can be used to cover the ink so that there will be no adverse effect on the contents of the package.

It will be understood that in the illustrations of the invention, black squares or other shaped indicia have been utilized on a white background. It will be understood that this could be negative, with white squares or other indicia on a black background. Alternatively, colors other than black and white could be used, but there must be a contrast between succeeding areas in the clocker or timing row and in proper places to indicate the difference between a bit indicating 1 or a bit indicating 0. The clocker or timing row has been illustrated in close proximity to the information-bearing roll, except in instances where it is spaced by the addition of further information, or in the case of the circular or square code areas. It is desirable to keep the rows close together for convenience and accuracy in handling by an optical scanner forming the input to a computer; yet they must be sufficiently far apart that there would be no undesirable interaction in reading of two adjacent rows. In each instance the clocker or timing row has been shown as the top or first row, with the data-bearing row as the second or succeeding row. In many instances it would be possible to reverse these, so that the information-bearing row would be the top or first row, while the clocker or timing row would be the second row. The specific disclosure herein is of a nonreturn-to-zero binary code. A binary code is preferable, since it is directly usable by the most common types of computers, at the fastest speeds and the lowest costs. However, it is contemplated that codes other than binary could be used.

The specific binary code shown in a superior code as it is particularly easy to read. Considering bits (or positions) of the data row against the clocker or timing row between the start and stop symbols, there are only four possible combinations, and these are in immediate, vertically spaced proximity. The combinations are as follows:

1. Black opposite black.
2. White opposite black.
3. White opposite white.
4. Black opposite white.

Because the clocker row is a basic return to zero system as in a sine wave, it is remarkably easy to read a data row against it. As will be appreciated, reading can be either left to right or right to left. Reading can be by way of transmitted or reflected light to any type of photocell or photosensitive device, and can be direct or by way of fiber optics or light pipes. A cathode-ray beam can be used for reading, as in a television-type pickup or scanner, and the image read can be displayed on a cathode-ray tube or can be impressed on a magnetic tape as impulses, etc.

A disclosure has been made as to the manner in which distortion laterally of a row will not cause misreading within rather wide limits. I propose that distortion longitudinally of a row be overcome by reading each space or bit in more than one location and primarily in the center thereof, but the mechanism for effecting this forms the subject matter of another invention. Where printing has been referred to herein, it is to be understood that this is intended in a broad sense, and will include other graphic arts processes, including, for example, but not by way of limitation, screen reproduction perforation or punching, use of magnetic and treated inks, etc. Practice has indicated a need for speed, precision, security and counterfeit protection in the preparation of the paper or document material and the code tracks both for machine-readable and human-readable data and the mechanisms for the preparation and checking and automated and human recognition or reading of these forms the subject matter of another invention.

Reference has been made to direct optical reading of the coupons or to the microfilming of the code tracks thereon, with subsequent optical reading of the microfilm. It is contemplated that there could be something in the nature of buffer storage, including, for example, magnetic tapes and core storage to which the information from the coupons could be transposed in proper fashion for subsequent recognition, validation, or feeding to a computer. It is possible that holographic techniques and the use of lasers could be adapted eo the coding and/or reading and handling of the code tracks. Furthermore, buffer or storage devices in the nature of punched paper tape, holograms, etc. could be used. The coupon could be of half size, with the code track (or tracks) on a short rather than a long side. When the code is applied to a label, it could be used for automated checkout, with the checkout apparatus adding one or more additional rows of data without the necessity of removing any part of the label. Coupons could be supplied in rolls and separated along perforations for use as tickets, as at airports, railway stations, etc., data being applied and read therefrom by automated equipment. It is contemplated that the coupons will be handled by vacuum apparatus. Hence, when the base sheet is paper, the paper must be substantially nonporous to prevent vacuumatic adherence of adjacent coupons to one another.

Thus, although certain specific examples have been set forth herein by way of illustration, it will be understood that various changes are contemplated, and that all that which falls within the purview of the following claims is to be construed as a part of my invention.

The invention is claimed as follows:

1. A coded computer input article having a face with an optically coded machine language readable asymmetric track thereon comprising at least two rows, one of said rows comprising a timing row and having alternating optically contrasting areas readable by a optical scanner and indicative of associated data information in an accompanying second row, said optically contrasting areas in the one row having substantially equal dimensions in the direction of scanning, and the other of said rows having areas corresponding to the successive information indicating positions of the first-mentioned row and directly readable in machine language by an optical scanner, said areas of said information row comprising alternating optically contrasting portions, some of said portions having dimensions in the direction of scanning which are substantially equal to that of an area of said timing row, and some of said portions having dimensions in the direction of scanning which are substantially a multiple of that of an area of the timing row so that such successive pieces of information represented by said portions constitute a serial display of the entire information of the code and are gated for direct reading successively by the contrasting areas of said timing row that serves only as a clock in a nonreturn-to-zero code, said track having at least one start reading area adjacent the leading end and at least one stop reading area adjacent the trailing end.

2. A coded article as set forth in claim 1 and further including a human-readable information track on said face of said article.

3. A coded article as set forth in claim 2 wherein the human-readable track is in optical machine character recognition indicia and is therefore machine readable.

4. A coded article as set forth in claim 1 and further including at least one additional information-bearing row corresponding to the first-mentioned timing row and bearing information different from that of the first-mentioned information-bearing row.

5. A coded article as set forth in claim 1 wherein said track is arranged in a circle.

6. A coded article as set forth in claim 1 wherein said track is arranged substantially in a square.

7. A coded article as set forth in claim 1 wherein at least first ones of said contrasting areas are of symmetric geometric shape.

8. A coded article as set forth in claim 7 wherein the first ones of said area are rectangular.

9. A coded article as set forth in claim 8 wherein the rectangular areas are square.

10. A coded article as set forth in claim 9 wherein the square areas have concave sides.

11. A coded article as set forth in claim 7 wherein the first ones of said areas are circular.

12. A coded article as set forth in claim 7 wherein the first ones of said areas are ellipses.

13. A coded article as set forth in claim 7 wherein the first ones of said areas are diamond shaped.

14. A coded article as set forth in claim 7 wherein the first ones of said areas are cross shaped.

15. A coded article as set forth in claim 1 comprising a coupon formed as an integral part of a larger label and separated from the remainder of said label by perforations to facilitate tearing of said coupon from said label.

16. A coded article as set forth in claim 15 and further including a tapered tear tab extending from a perforated edge of said coupon further into said label.

17. A coded article as set forth in claim 16 and further including a flap extending from said tear tab further into said label and defined by a slit between said flap and the remainder of said label.

18. A coded article as set forth in claim 1 comprising a coupon formed as an integral part of an envelope flap.

19. A sheet of material having a binary nonreturn-to-zero asymmetric code track portion: said track portion having first and second elongated spaced-apart rows each of optically contrasting portions; said first row being only a timing row and said second row being only an information row, each of said rows comprising alternate first and second adjacent portions, each of said first adjacent portions being optically contrasting in character relative to each of said second adjacent portions, said first and second adjacent portions of said first row being alternately disposed and contiguous with each other; each of said first and second adjacent portions of said first row being generally rectangular and being of dimensions similar to one of said portions of said first row, and some of said first and second adjacent portions of said second row being relatively elongated longitudinally along said second row and of a length equal to a plurality of said first and second adjacent portions of said first row so that successive bits of information represented by said elongated portions may be read directly as one of two states of the binary code during successive timing intervals as gated by said portions of said first row, said track portion having at least one start reading portion adjacent the leading end and at least one stop reading portion adjacent the trailing end.

20. A sheet of material as set forth in claim 19 wherein said sheet has a marginal edge, and wherein said track is disposed adjacent said edge.

21. The invention as defined in claim 19 wherein; said sheet of material is a photographic microfilm, and whereon a plurality of said track portions are arranged generally in parallel adjacent relationship to each other and directed transversely of the longitudinal axis of the film.

22. The invention as defined in claim 19 wherein: said sheet of material is a photographic microfilm, and whereof a plurality of said track portions are arranged generally in parallel adjacent relationship to each other and directed longitudinally of the longitudinal axis of the film.

23. The invention as defined in claim 19 wherein: said first and second adjacent portions of said first row are spaced slightly from said first and second adjacent portions of said second row to avoid ink flow printing problems between said rows when said first adjacent portions of said first and second rows are printed on said sheet.

24. The invention as defined in claim 19 wherein: a plurality of said sheets are integral with each other in edge-to-edge relationship.

25. The invention as defined in claim 19 wherein: an elongated start portion is similar to said first adjacent portion of said first and second rows and a start portion of each of said first and second adjacent rows is located at one end of said first row and at an opposite end of said second row, said start portions being adapted to serve as scanning start and stop indicators relative to timing and data bits represented by said first and second rows, respectively.

26. A merchandising coupon comprising an asymmetric code track portion, said track portion having a timing row and a plurality of information rows, each row comprising first and second adjacent portions, each of said first portions in a row being optically contrasting in character relative to the second portions in the row, said first and second portions in the timing row being alternately disposed and contiguous with each other, said first portions of said timing row also being symmetrically spaced apart by said second portions thereof, at least one of said portions of each information row being generally of a dimension similar to one of said portions in the timing row, at least one of said first and second portions of each information row being of a length equal to a plurality of said first and second portions of the time row, and means furnishing gating signals to a reading device to read the information directly from an information row upon completion of the reading of the information from a preceding information row, said means comprising adjacent contrasting portions of information rows, said track portion having at least one start reading portion adjacent the leading end and at least one stop reading portion adjacent the trailing end.

27. A method comprising preparing a computer input document by imprinting thereon an asymmetric binary track having at least two optically coded rows, one of said rows being entirely a timing row and having alternating optically contrasting areas readable by an optical scanner, another of said rows being entirely a merchandising data alternating row, said contrasting areas of the timing row having substantially equal dimensions in the direction of scanning, said information row having alternating optically contrasting portions readable by an optical scanner, some of said portions having dimensions in the direction of scanning which are substantially equal to that of an area of said timing row, and some of said portions having dimensions in the direction of scanning which are substantially a multiple of that of an area of the timing row, said track portion having at least one start reading portion adjacent the leading end and at least one stop reading portion adjacent the trailing end, optically scanning said rows to determine a binary value of the information of said information row directly and gating the reading of said information row by said timing row such that the timing row constitutes purely a clock for reading information from the information row in a nonreturn-to-zero code in which all of the data information is represented by said information row, and turning said reading on and off by said start and stop areas.

28. A method according to claim 27 including spacing apart slightly said two rows to avoid ink flow printing problems between said rows when they are printed on said document.

29. A method according to claim 27 including providing on said document a distinctive appearing indicia correlative to a particular merchandising scheme.

* * * * *

UNITED STATES PATENT OFFICE
CERTIFICATE OF CORRECTION

Patent No. 3,632,995 Dated January 4, 1972

Inventor(s) Howard W. Wilson

It is certified that error appears in the above-identified patent and that said Letters Patent are hereby corrected as shown below:

Col. 2, line 16, change "have" to --make--
Col. 4, line 6, change "thereof" to --thereon--
Col. 4, line 64, change "rack" to --track--
Col. 5, line 63, change "observe" to --obverse--
Col. 8, line 26, change "ad" to --and--
Col. 9, line 45, change "section" to --sector--
Col. 9, line 67, after "B" insert --D--
Col. 11, line 63, after "has" insert --been--
Col. 12, line 38, change "identify" to --identity--
Col. 13, line 40, change "of" to --off--
Col. 14, line 26, change "above" to --about--
Col. 14, line 36, change "likes" to --lines--
Col. 15, line 18, after "rectangular" insert --code--
Col. 15, line 62, change "in" to --is--
Col. 16, line 34, change "eo" to --to--
Col. 18, line 10, change "whereof" to --whereon--
Col. 18, line 58, change "alternating" to --information--

Signed and sealed this 18th day of July 1972.

(SEAL)
Attest:

EDWARD M.FLETCHER,JR.
Attesting Officer

ROBERT GOTTSCHALK
Commissioner of Patents

USCOMM-DC 60376-P69
☆ U.S. GOVERNMENT PRINTING OFFICE : 1969 O—366-334